July 18, 1961  M. KOSMIN ET AL  2,993,005
MANUFACTURE OF AEROGELS
Filed Sept. 3, 1957
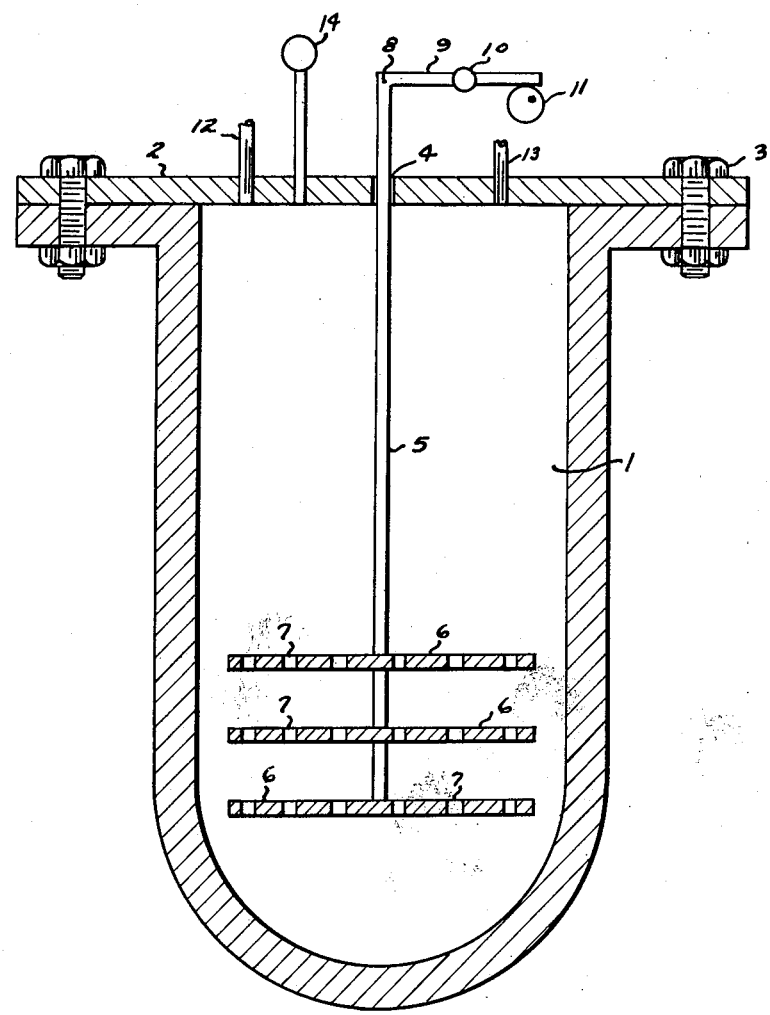
INVENTORS
MILTON KOSMIN
JOHN W. ANDERSEN
BY
Herman O. Bauermeister
ATTORNEY United States Patent Office 2,993,005
Patented July 18, 1961

2,993,005
MANUFACTURE OF AEROGELS
Milton Kosmin and John W. Andersen, Dayton, Ohio, assignors to Monsanto Chemical Company, St. Louis, Mo., a corporation of Delaware
Filed Sept. 3, 1957, Ser. No. 681,753
1 Claim. (Cl. 252—317)

This invention relates to improvements in the process of producing aerogels from colloidal solutions and particularly to a method whereby the production rate of such gels may greatly be increased by the use of a specific shear agitation process during the formation of the gel.

An aerogel is defined as a dry gel, one continuous phase of which is a gas such as air. Aerogels are prepared from colloidal solutions precipitated under certain conditions. Gels are distinguished from precipitates of colloidal solutions in the fact that the gels contain large quantities of the solvent in a soft "gelatinous" mass usually microscopically heterogeneous. Such gels generally present some rigidity. Gels may be divided into two classes, the gelatinous precipitates and the jellies, according to whether the product formed settles out in a flocculent mass or occupies the entire volume that the original solution occupied and which appear microscopically homogeneous.

Gels may be again divided into elastic and non-elastic groups according to whether the gel will re-swell or not after being dried when placed in the original solvent. Examples of the elastic gel type are gelatin and egg albumin, while examples of the non-elastic gel are silica and alumina gels.

The present invention relates to a new mode of removing the solvent from a gel, either elastic or non-elastic in preparation for its use in the solid, dry state. The present invention is applicable to a variety of inorganic gels such as those based upon silica, alumina, hydrous iron oxide, and other amphoteric oxides. Such oxides and the co-precipitated combinations thereof, for example, silica together with alumina, have utility as catalysts, for instance as hydrocarbon cracking catalysts. Inasmuch as the most widely used oxide of this type is silica, the mode of preparation will be set forth with regard to this material.

Essentially the present process comprises the converting of a colloid to an aerogel in which process a colloidal solution is heated to a temperature above the critical temperature and the solvent evaporated at said temperature. The improvement which has been provided in the said process comprises subjecting the said colloidal solution to vibratory agitation while the solvent is evaporated. It is preferred that the vibratory agitation be a shear type of agitation, in which the shearing forces the aerogel to an acceleration of from 3 to 15 times the force of gravity, and with a frequency greater than 1000 (preferably from 1000 to 3600) cycles per minute, and with an axial stroke of the vibratory shear agitator of from 0.01 to 0.60 inch.

It is conventional to prepare a silica gel by mixing a solution of sodium silicate with sulfuric acid whereupon the mixture upon standing becomes a stiff gel. The gel is then broken up, washed free of salts such as sodium sulfate, then allowed to dry slowly to a hard glassy mass as a result of the extreme shrinkage which is characteristic of such materials. An improvement over this method has been suggested in U.S. Patent 2,093,454. In the improved process, a precipitate of the gel suspended in water and/or alcohol is first obtained, after which the entire mixture is subjected to a temperature above the critical point in a pressure vessel while releasing the vapor at a rate insufficient to injure the gel. In this method, when operating at high production rates, the gel is obtained as a lumpy material, ordinarily with the pieces being from 0.5 to 4 inches in size. Furthermore, it has been found that this method presents difficulty with regard to heat transfer to the gel. The heating step must be carried out with the gel in an autoclave or other pressure vessel. Heat is then applied externally with the result that a scale-like layer is formed on the interior wall of the vessel, while the interior of the mass of the gel in the vessel remains liquid. Consequently, it is necessary to supply further heat to dry the interior portion of the mass of gel; this additional heat must come from an exterior heat source with the heat passing through the insulating layer of the dry silica. Inasmuch as this expanded form of silica is one of the best heat-insulating materials known, it becomes apparent that the transmission of heat to the interior of the gelatinous mass is very difficult and slow. After all of the water and/or alcohol has been evolved, it is necessary to remove the dry silica from the vessel. The product thus obtained is removed from the autoclave with considerable difficulty since it is found to be tightly adherent to the autoclave walls. Consequently, it is often necessary to use vigorous mechanical methods to remove the dry silica gel.

It has now been found that the formation of a gel from a colloidal solution such as the gelatinous dispersion of silica in water, or in water and alcohol as described above, may greatly be improved if the said mixing of solution during evaporation is subjected to a high-speed vibratory agitation which shears the mass during the supercritical heat and solvent evaporation step. It has been found that the modification of the gel drying process by means of the present improvement makes it possible to increase the production of aerogel as much as four times in contrast to the prior art method. The shearing agitation is preferably carried out by means of perforated plates having at least 5% but not more than 50% of the area of the plates perforated.

The shearing movement to which the gel-liquid mixture is subjected is one of acceleration and may be expressed in "$g$" units which represent the acceleration due to gravity. The units in which "$g$" is expressed in the present case are gm./sec./sec. The present range of the shearing force acceleration in the process of the present invention is from 3 to 15 times the force of gravity. It has been found that when the process is carried out within this preferred range, a finely powdered dry gel is obtained at a high rate of production without the formation of scale on the heat surface. In addition, the product is obtained lump-free and does not adhere to the heat surface. The vibratory agitation may be carried out over a wide range of conditions subject to the above criterion of acceleration, e.g., within frequency values varying from 1000 to 3600 cycles per minute. The amplitude of variation may similarly be varied over a wide range such as from 0.01 to 0.60 inch of stroke. It is preferred, however, that the axial stroke be in the range of 0.10 to 0.60 inch in order to achieve the most effective shear type of agitation.

It has also been found that the product obtained in the practice of the present invention is a finely divided material which can readily be removed and conveyed in an air stream through the autoclave piping without the necessity of removing the autoclave head as has been necessary in the prior practice in order to scrape out the lumps of product from the vessel.

Before describing further the details of the embodiment chosen to illustrate the methods of the invention, a typical example of the apparatus employed in the present invention will be described and the operation briefly analyzed. Referring to the drawing accompanying the present application, the numeral 1 represents the housing or body of a jacketed autoclave, while 2 represents a head for this vessel which is sealed to the body 1 by conventional means such as nuts and bolts 3. The head 2 is provided with a center opening or passageway 4 through which the vibrating shaft 5 passes into the autoclave. A suitable, conventional packing secured about shaft 5 reduces leakage. The agitator shaft 5 is provided with a plurality of perforated discs 6 which serve to carry out the actual shearing agitation of the gel. The discs are provided with openings or perforations 7 in order to increase the effective shearing of the mass of the gel and solvent which is being subjected to drying. The shaft 5 is axially agitated by suitable means such as a lever 9 pivoted to shaft 5 by a coupling 8. The shaft 9 is pivoted about a fulcrum 10 and actuated by an eccentric 11. The vessel is also provided with an entry line 12 and a vent 13 as well as a pressure gage 14 communicating with the interior of the vessel.

The following examples illustrate specific embodiments of the present invention:

*Example 1*

A 5-gallon autoclave was charged with 33.4 lb. alcosol containing the equivalent of about 9.5% $SiO_2$. The $SiO_2$ was added as sodium silicate and the pH was adjusted to 2.7 using $H_2SO_4$. Precipitated $Na_2SO_4$ was then filtered off. Just before charging the pH was adjusted, using $NaHCO_3$, to 3.7. The ratio of alcohol to water in the alcosol was about 10 parts to 8 parts. The solution introduced into the autoclave was a clear liquid. The autoclave was then subjected to slow heating by means of a number of electrical heaters located around the exterior wall of the vessel. The autoclave was also provided with a system of interiorly located thermocouples in order to measure the heat formed during gelation. In the present controlled tests conducted without any internal agitation, it was observed that gelation began at 85° C. after three-quarters of an hour although the pressure in the autoclave remained quite low. It was found by means of the radial temperature profiles that the flow of heat into the mass of gel occurred as if the mass were rigid. After the center had begun to rise above the initial gelling temperature of 85° C., it was observed that the pressure rose rapidly to a maximum of 1,800 pounds per square inch with the entire reaction mass reaching a temperature of 200° C. At this time, the vent on the autoclave was slowly opened and the vapors of alcohol and water vented from the system. A period of about 3 hours was required for the evolution of vapor, the temperature then reaching 300° C., after which the vessel was cooled and the head of the autoclave removed. It was found that the reaction product consisted of friable lumps of silica aerogel of about one-half inch average diameter. These granules could be crushed to a fine powder having the microscopic dimensions of the silica aerogel.

*Example 2*

In order to show the effect of shear agitation upon the conversion of the silica to a silica aerogel, the procedure of Example 1 was repeated with the modification that the autoclave was provided with 3 perforated disc agitators mounted on a single shaft driven from the head of the vessel. The three agitator discs were nine inches in diameter and were drilled with five-sixteenth inch holes which constituted 35% of the cross-sectional area of the disc, and consequently, of the cross-section of the autoclave in which the disc closely fitted. The set of discs were vibrated with an amplitude of one-half inch and a frequency of 1100 vibrations per minute. This motion corresponds to subjecting the mass within the agitator to an acceleration of 4 "g" units.

In the present run it was found that the initiation of gelation also took place at about 85° C., after three-quarters of an hour of heating. However, it was also found in the present example that the entire reaction mass remained quite uniform in temperature throughout the heating period because of the shear agitation. The venting step was carried out more rapidly, so that the overall time for the production of a charge of aerogel was 4.5 hours in contrast to the 5.5 hours required in Example 1.

When the autoclave was opened, it was found that the reaction product removed therefrom was a very finely divided powder suitable for use as a thermal insulating material without the necessity for a grinding step as in Example 1.

In the general procedure of the present invention, a liquid is converted to a gel form which is then dried by heating under supercritical conditions until vapors are no longer given off from the vent of the autoclave. It is found that the aerogel product thus obtained has a very finely divided form so that the particles may be removed by introducing a stream of air to the autoclave inlet. The mixture of air and the aerogel then leaves from the vent. It has been found that the time required to produce a batch of aerogel by this method is about 4.5 hours in contrast to a period of about 5.5 hours required by the older method. The silica aerogel obtained by the present method is found to have a bulk density of about 0.18 g./cc. and a surface area of 261 square meters per gram (Brunauer, Emmett, and Teller method). This product is a very useful material for heat insulation and may also be used as a flatting agent in the manufacture of lacquers and varnishes.

Simple rotary agitation such as by means of a paddle stirrer is insufficient for the present purpose. Axial vibratory shear agitation overcomes the problems of the prior art in the formation of a gel with the evolution of the solvent as a vapor under supercritical conditions, thus making it possible to obtain the powdered oxide as an aerogel. It has been found that the vibratory oscillation is preferably maintained with a rapidity greater than 1000 cycles per minute, the preferred range being from 1000 to 3,600 cycles per minute. Another desirable condition which has been observed is that the axial stroke of the vibratory agitator be greater than one-tenth inch in magnitude.

What is claimed is:

In the process for converting silica to an aerogel, in which process a gelatinous dispersion of silica is heated to a temperature above the critical temperature and solvent evaporated at said temperature, the improvement which comprises subjecting said gelatinous dispersion of silica to vibratory shear agitation with an agitator operating at a frequency greater than 1000 cycles per minute, in which the aerogel is subjected to acceleration of from 3 to 15 times the force of gravity, and in which the axial stroke of the vibratory agitator is greater than one-tenth inch.

References Cited in the file of this patent

UNITED STATES PATENTS

| | | |
|---|---|---|
| 2,093,454 | Kistler | Sept. 21, 1937 |
| 2,543,818 | Wilcox | Mar. 6, 1951 |
| 2,588,853 | Kumins et al. | Mar. 11, 1952 |
| 2,615,692 | Müller | Oct. 28, 1952 |
| 2,661,192 | Horsley et al. | Dec. 1, 1953 |

FOREIGN PATENTS

| | | |
|---|---|---|
| 22,849 | Great Britain | 1905 |